United States Patent
Ribbeck

(10) Patent No.: US 9,757,840 B2
(45) Date of Patent: Sep. 12, 2017

(54) METHOD FOR COMPENSATING TEMPERATURE-INDUCED DEVIATIONS IN A GRINDING MACHINE AND MACHINE BEING EQUIPPED CORRESONDINGLY

(71) Applicant: Klingelnberg AG, Zürich (CH)

(72) Inventor: Karl-Martin Ribbeck, Remscheid (DE)

(73) Assignee: KLINGELNBERG AG (CH)

( * ) Notice: Subject to any disclaimer, the term of this patent is extended or adjusted under 35 U.S.C. 154(b) by 43 days.

(21) Appl. No.: 14/991,525

(22) Filed: Jan. 8, 2016

(65) Prior Publication Data
US 2016/0199963 A1    Jul. 14, 2016

(30) Foreign Application Priority Data
Jan. 13, 2015 (DE) .......... 10 2015 100 374

(51) Int. Cl.
| B24B 49/00 | (2012.01) |
|---|---|
| B24B 49/14 | (2006.01) |
| B23F 23/12 | (2006.01) |
| B24B 49/18 | (2006.01) |
| B24B 53/08 | (2006.01) |

(52) U.S. Cl.
CPC .......... *B24B 49/14* (2013.01); *B23F 23/1225* (2013.01); *B24B 49/18* (2013.01); *B24B 53/08* (2013.01)

(58) Field of Classification Search
CPC ......... B24B 49/14; B24B 49/18; B24B 53/08; B23F 23/1225
USPC ...................................... 451/5, 7, 21, 53, 47
See application file for complete search history.

(56) References Cited

U.S. PATENT DOCUMENTS

| 2,956,344 | A | * | 10/1960 | Rantsch | B24B 49/14 33/503 |
|---|---|---|---|---|---|
| 4,266,375 | A | * | 5/1981 | Nishimura | B24B 49/10 318/571 |
| 4,372,085 | A | * | 2/1983 | Wiener | B23F 1/02 451/403 |
| 4,776,137 | A | * | 10/1988 | Loos | B23F 19/052 451/253 |
| 8,882,564 | B2 | * | 11/2014 | Kobialka | B23F 23/1225 451/10 |

(Continued)

FOREIGN PATENT DOCUMENTS

| DE | 3835780 A1 | 5/1989 |
|---|---|---|
| DE | 3827581 A1 | 2/1990 |
| DE | 10314199 A1 | 11/2003 |

OTHER PUBLICATIONS

German Search Report Issued for DE 10 2015 100 374.0, issued Jan. 12, 2016.

*Primary Examiner* — George Nguyen
(74) *Attorney, Agent, or Firm* — McCarter & English, LLP

(57) ABSTRACT

Method for compensating temperature-induced deviations in a grinding machine includes controlling the movements of the dressing tool relative to the grinding tool in order to relatively move the dressing tool towards the grinding tool; checking whether a first-cut detection signalizes a contact of the grinding tool and the dressing tool; repeating the controlling and checking steps until a contact between the grinding tool and the dressing tool is detected, and when the contact is detected, then (i) recording the Current Position, and (ii) carrying out a compensation calculation using the Current Position and a reference position.

13 Claims, 4 Drawing Sheets

(56) References Cited

U.S. PATENT DOCUMENTS

2003/0204287 A1* 10/2003 Shirakawa ........... G05B 19/404
  700/193
2012/0156963 A1* 6/2012 Vogler ................ B23F 23/1218
  451/5

* cited by examiner

METHOD FOR COMPENSATING TEMPERATURE-INDUCED DEVIATIONS IN A GRINDING MACHINE AND MACHINE BEING EQUIPPED CORRESONDINGLY

CROSS-REFERENCE TO RELATED APPLICATION

This application claims priority under 35 U.S.C. §119(a)-(d) to German application no. DE 10 2015 100 374.0 filed Jan. 13, 2015, which is hereby expressly incorporated by reference as part of the present disclosure.

FIELD OF THE INVENTION

The invention concerns a method for compensating temperature-induced deviations in a grinding machine and machines being equipped correspondingly.

BACKGROUND OF THE INVENTION

There are many mechanical machining procedures which employ grinding tools. In particular, in the field of gear tooth processing grinding tools are employed which may be dressed. There are, for instance, grinding discs which are almost saucer-shaped, cup-shaped or conical. These grinding tools are typically covered with an abrasive material that is especially suited for dressing.

In addition to the grinding tool there is often provided a dressing tool in a grinding machine, which may be employed for dressing the grinding tool if needed. Modern grinding machines typically comprise a dressing tool driven so as to rotate and which are contour controlled for an automated definition and for the dressing of the grinding tool.

If, for example, the grinding of a toothing is concerned, the working surfaces of the grinding tool have to be brought back into the desired shape (called profiling) after a certain period of time in order to guarantee a sufficient quality of the toothing.

It is a precondition for dressing by means of dressing tools that a relative dressing (grinding) movement may occur between the dressing tool and the grinding tool. The dressing tool may rotate in the same direction or in the opposite as the grinding tool. For rotating dressing tools, the velocity ratio between the grinding tool and the dressing tool is one of the parameters that may influence the dressing result.

The form and profile dressing procedures are subject to many factors that may influence the dressing of the grinding tool considerably.

Investigations have revealed that, when grinding a work piece after an interrupt of a production process, inaccuracies may result. Detailed analysis may lead to the conclusion that these inaccuracies are caused by temperature-induced variations of the grinding machine. A grinding machine in its cooled-down state, for example, has a minimum different relative position of the grinding tool relative to the dressing tool and/or to the work piece than a continuously operating grinding machine, which may have a higher intrinsic temperature. Such an altered relative position caused by the temperature may have an impact on the accuracy of the dressing. That is, the grinding tool may have a slightly changed geometry as compared to the nominal value.

It is well known that a contouring machine might be equipped with a tactile coordinate sensor, e.g., in order to measure the work piece during processing or during processing breaks. Such a tactile coordinate sensor, however, is neither suitable for measuring the dressing tool nor for measuring the grinding tool. This is because the dressing tool is typically covered with poly-crystal or natural diamond or some other hard material. When contacting the dressing tool, the ruby-probe of a tactile coordinate sensor could get destroyed quickly.

SUMMARY OF THE INVENTION

It is an objective to provide an alternative which makes it possible for a grinding machine with a dressable grinding tool that may recognize whether a temperature-induced variation has occurred. An approach is provided which may be employed in the environment of an automated machine and which makes it possible to compensate a detected, temperature-induced variation.

In connection with some embodiments of the invention, a CNC-contour controlled dressing role or disc may be employed as dressing tool. However, the dressing tool may also be fixed to the machine bed or to another stationary or displaceable machine component so that it may be driven to rotate. In the latter case, the required contour control occurs by CNC-controlled movement of the axis which move the grinding tool relative to the dressing tool while the dressing tool is just rotating about the dressing axis.

In a method for compensating temperature-induced variations in a grinding machine, the machine may comprise: a tool spindle with a grinding tool which may be driven so as to rotate; a dresser with a dressing tool which may be driven so as to rotate; a (CNC) control for controlling the movements of the dressing tool relative to the grinding tool; a first-cut detection being designed so as to signalize a contact of the grinding tool with another part of the grinding machine. The method includes the following steps:
 a. Controlling the movements of the dressing tool relative to the grinding tool in order to relatively move the dressing tool towards the grinding tool,
 b. Checking whether the first-cut detection signalizes a contact of the grinding tool and the dressing tool,
 c. Repeating the steps a. to c. until a contact between the grinding tool and the dressing tool was signalized;
 d. If a contact between the grinding tool and the dressing tool was signalized, then
   i. Recording the current position,
   ii. Carrying out a compensation calculation using the current position and a reference or given position.

Some of the steps may be carried out concurrently or in a time-staggered manner in different embodiments, for example, steps a., b., d.i., and d.ii.

In some embodiments, the first-cut detection is used to detect contact of a grinding disc with a work piece. The invention is breaking new ground in that the first-cut detection is employed for purposes other than previously contemplated. This is possible due to increased precision in first-cut detection.

Calculatively performed coordinate transformations may be employed to transform a determined current position into a statement which is related to the actual position of the grinding tool and/or the dressing tool within the coordinate system of the grinding machine.

A grinding machine in accordance with some embodiments operates precisely during the dressing even in case of temperature-induced changes since the defined relative position of the grinding tool relative to the dressing tool may be determined inside the grinding machine. A precise reference, which is advantageously used in connection with various embodiments of the invention, is thus available.

In particular, in the field of the automated batch production, intervention is now possible from time to time or if needed before, due to a change of the relative position, to prevent production of deficient grinding tools and/or gears.

Grinding machines are made more economical when using the invention and the machining is more precise than hitherto achieved.

Various embodiments of the invention may be used in CNC-controlled spiral bevel gear grinding machines, and also when grinding spur gears.

The invention facilitates an improvement of the automation of the dressing procedure and repeatable, higher precision with a lower proportion of rejections.

A method in accordance with certain embodiments of the invention enables predefined (programmed) relative dressing movements of the dressing tool to be modified by applying compensation within the machine, so that, despite temperature-induced changes, an optimum working is still possible.

During the first-cut detection, at least one of the elements involved (e.g. the grinding tool) may be driven so as to rotate. The respective other element involved (e.g. the dressing tool) may stand still. Both elements involved (the grinding tool and the dressing tool) may be driven so as to rotate during the first-cut detection.

In order to achieve a very good precision, some grinding machines may be equipped with a diamond dressing roll fixedly connected to the machine bed. That is, the diamond dressing roll in these embodiments may not require an additional machine axis (except for the axis of rotation). In such a case, depending on the embodiment, the grinding tool is moved against the diamond dressing roll while it is rotating, in order to detect temperature-induced changes by means of the mentioned first-cut detection, and to compensate for these changes.

BRIEF DESCRIPTION OF THE DRAWINGS

Further details and advantages of the invention are described hereafter on the basis of exemplary embodiments and with reference to the drawings.

DETAILED DESCRIPTION OF EMBODIMENTS OF THE INVENTION

Terms are used in conjunction with the present description which are also used in relevant publications and patents in the art. However, it is to be noted that the use of these terms is only to serve for better comprehension. The concept of the invention and the scope of protection of the patent claims are not to be restricted in the interpretation by the specific selection of the terms. The invention may be readily transferred to other term systems and/or technical fields. The terms are to be applied accordingly in other technical fields.

All drawings are schematic and not drawn to scale.

Figure 1A:
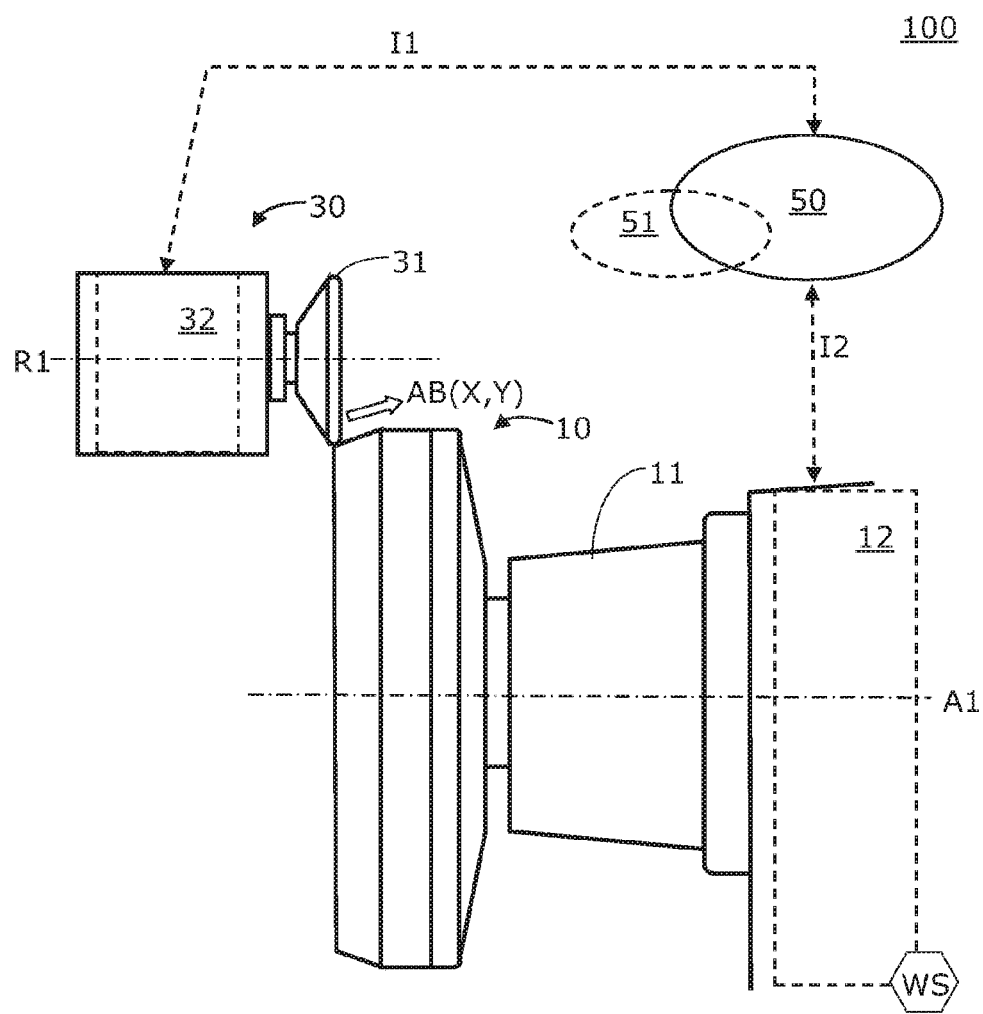
FIG. 1A shows a schematic side view of a portion of a grinding machine with a grinding cup, which, in the moment shown, is being dressed by means of a dressing disc at the outer circumference.

In the following description, a grinding is described by means of the simplified sketch of FIG. 1A. FIG. 1A shows elements of a grinding machine 100 and the (relative) movements of these elements. A work piece is not illustrated in this drawing but it should be understood that the grinding machine 100 is adapted to work on a work piece.

A side view of an exemplary grinding disc 10 is illustrated, which can be driven so as to rotate about a tool axis A1. As schematically illustrated, the grinding disc 10 is mounted on a tool spindle 11. A dresser 30 with a dressing tool 31 (shown having the shape of a form-dressing disc) is illustrated next to the grinding disc 10. The dressing tool 31 can be driven so as to rotate about a dressing axis R1.

In FIG. 1A, it is indicated by means of an arrow AB(XY) that the dressing tool 31 can be moved relative to the grinding disc 10 along the outer profile of the grinding disc 10 (called "dressing movement"). The respective movement AB(X, Y) may be carried out by the dressing tool 31, by the grinding disc 10, or by the dressing tool 31 and the grinding disc 10. The respective movement is herein thus referred to as a "relative movement". The designation AB(X,Y) indicates that the dressing movement AB comprises movement vectors in parallel to the X- and the Y-axis of the grinding machine 100 (see also FIG. 3).

Figure 2:
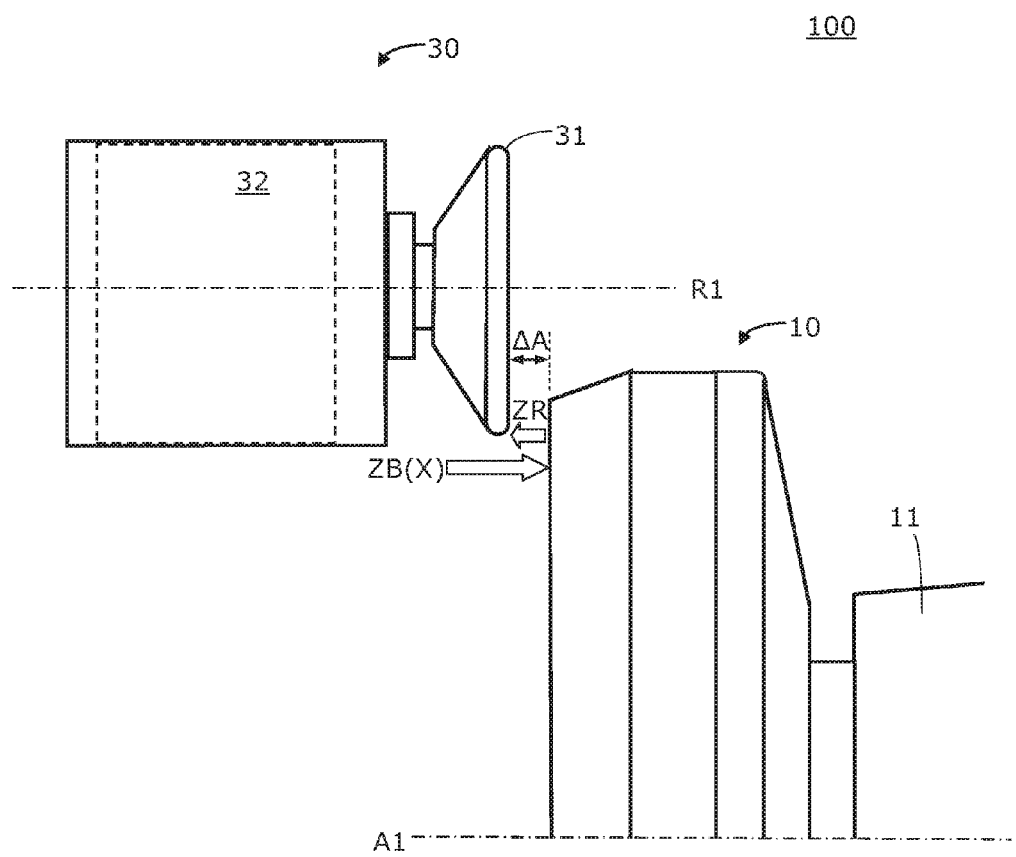
FIG. 2 shows an enlarged schematic side view of a portion of the grinding machine of FIG. 1A, where, in the moment shown, a relative distancing movement is carried out.

An approaching movement ZB of the dressing tool relative to the grinding disc 10 is shown in FIGS. 1A and 2. The expression "approaching movement" is herein used to define a relative movement which enables the dressing tool 31 to be brought in contact with the grinding disc 10. After a compensation value is determined, the dressing movements AB, may be adapted while moving the dressing tool 31 relative to the grinding disc 10.

A dressing machining of the grinding disc 10 with the dressing tool 31 (by carrying out the dressing movement AB) is known in the art. The dressing movement AB could be a CNC-controlled relative movement in the three-dimensional space. The respective relative movements can be provided and controlled by a CNC-control 50. A CNC-control 50 is schematically depicted in FIG. 1A. A circuit connection I1 extends from the CNC-control 50 to a rotary drive 32 of the dresser 30 and a circuit connection I2 extends from the CNC-control 50 to a rotary drive 12 of the grinding tool 10. Other axle drives, which are controlled by the CNC-control 50, too, are not shown in FIG. 1A. These axle drives may be used, as known in the art, in order to carry out a dressing movement AB and an approaching movement ZB.

The circuit connections I1 and/or I2 are depicted in the Figs. by means of double-ended arrows, since the drives 32 and/or I2 are controlled by signals from the CNC-control 50 via these connections I1 and/or I2, and also signals are carried from these drives 32 and/or I2 to the CNC-control 50. A regulating circuit may be achieved by sending back such signals, thus enabling the movements to be controlled (e.g. by the use of path sensors WS and/or angular decoders).

FIG. 1B again shows a part of the grinding machine 10 of FIG. 1A, where at the given moment a relative approaching movement ZB(Y) of the dressing tool 31 with respect to the grinding tool 10 is being carried out. The relative approaching movement ZB(Y) in this schematic example is intentionally directed so that the dressing tool 31 contacts the grinding tool 10 at its outer circumference. In this example, the relative approaching movement ZB(Y) occurs perpendicularly with respect to the tool axis A1, i.e., radially with respect to the grinding tool 10. The approaching movement ZB(Y) occurs in parallel to the Y-axis (see also FIG. 3) of the grinding machine 10. This is why in this case the approaching movement is designated as ZB(Y).

The contacting of the grinding tool 10 in the illustrated embodiment occurs in an area 13 which is not used for grinding machining of a work piece. The area 13, in the present example, is an annular area at the outer circumference of the grinding tool 10. Other areas of the grinding tool 10 for contacting by the dressing tool 31 may alternatively be selected, too (see, for instance, FIG. 2).

The first-cut detection 51 is illustrated as separate module in the area of the CNC-control 50. The first-cut detection 51 may be a module of the CNC-control 50, but the first-cut detection 51 may also be a module which is assigned to the CNC-control 50, e.g., which is linked to it. In one case, the first-cut detection 51 comprises a sensor which provides a signal to the CNC-control 50, and software which carries out the signal processing and the compensation calculation(s) in the CNC-control 50.

Figure 1B:
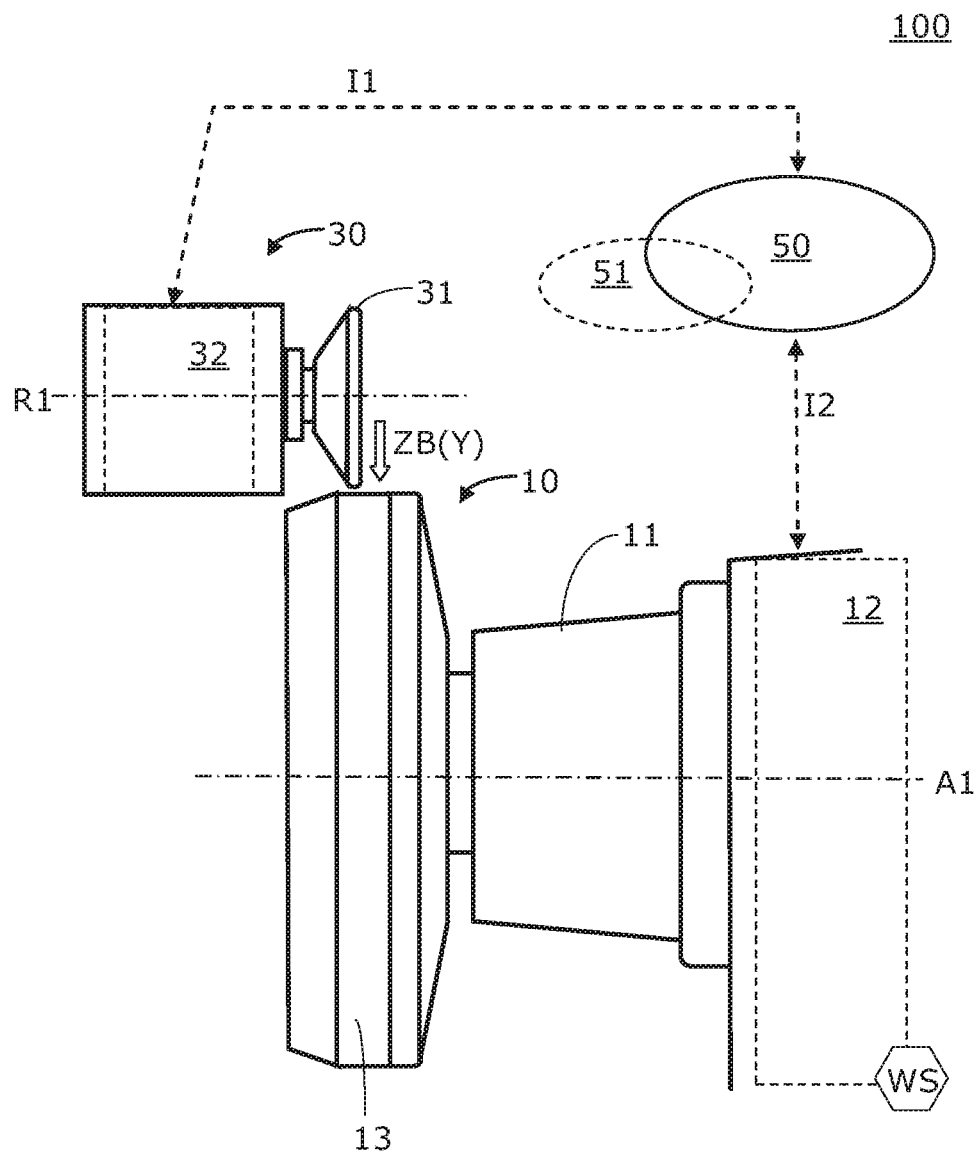
FIG. 1B shows a schematic side view of a portion of the grinding machine of FIG. 1A, where, in the moment shown, a relative approaching movement of the dressing disc is being carried out with respect to the grinding tool.

In the case of the embodiments of the FIGS. 1A and 1B, the first-cut detection 51 takes place by means of an evaluation of the power intake or use of the drive 32 of the dresser 30. At the moment where a first slight contact of the dressing tool 31 with the grinding tool 10 occurs, the power intake is increased because of the friction between the dressing tool 31 and the grinding tool 10. The increase of the power intake may be processed, evaluated and signalized by the first-cut detection 51.

Figure 3:
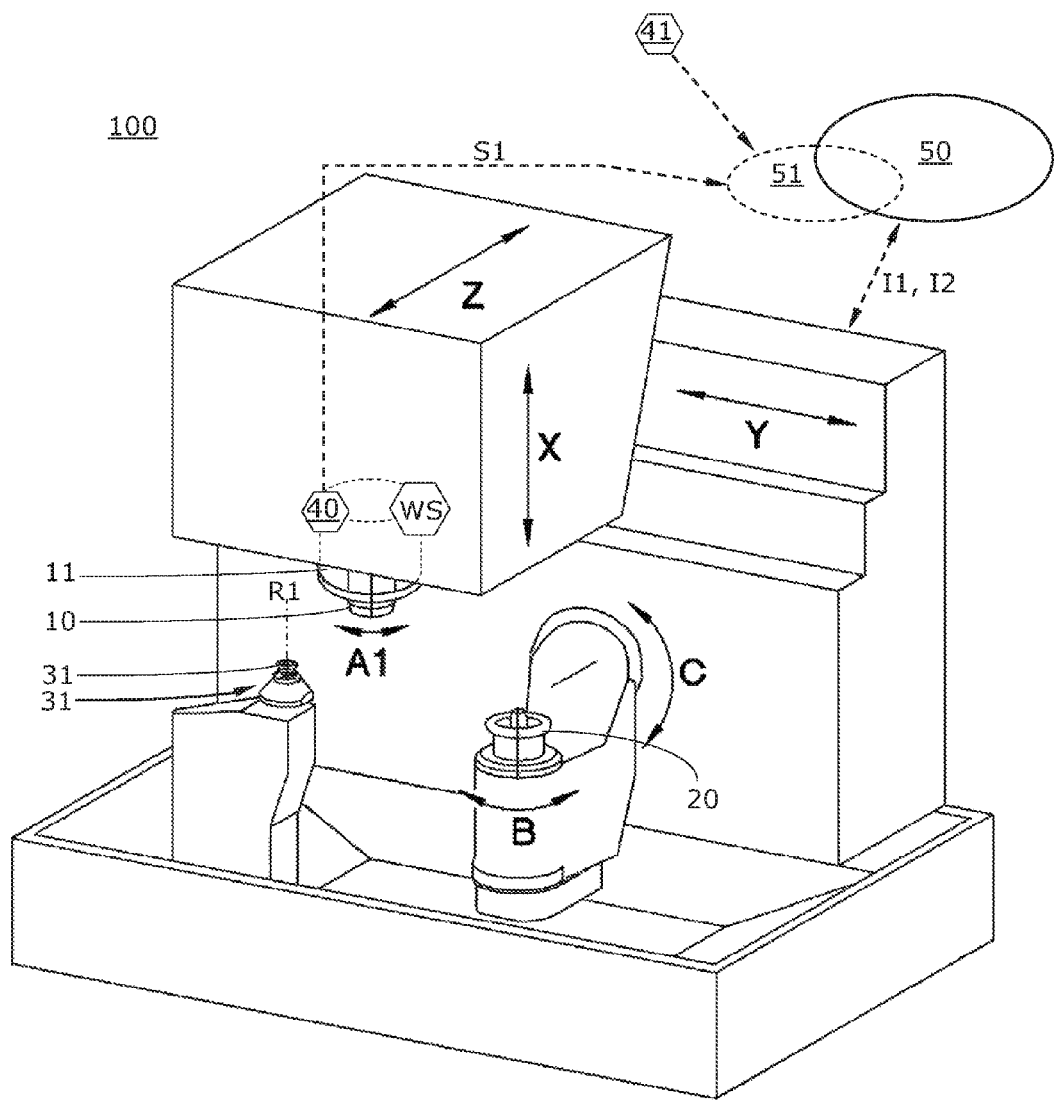
FIG. 3 shows a schematic representation of a (bevel gear) grinding machine with designation of the axis.

For example, as soon as the power intake exceeds a threshold value, the first-cut detection 51 deems a contact of the grinding tool 10 with the dressing tool 31 to have taken place. In this case, the first-cut detection 51 signals the occurrence of a contact. The example of such a signaling is shown in FIG. 3. Simultaneously or immediately after such a contact, the current relative position of the grinding tool 10 and the dressing tool 31 are recorded. This position is herein referred to as "Current Position."

Depending on the embodiment of the invention, the Current Position may be related to a reference or given position. The Current Position may be kept in a memory (not shown) of the grinding machine 100, for example. The reference or given position, for example, provides the position in a 3-D space where a contact between the grinding tool 10 and the dressing tool 31 should have occurred. Due to the fact that the Current Position is related to a reference or given position, the grinding machine 100 may be able to determine (arithmetically) the current deviation, e.g., change of position.

A compensation by means of calculation may then be carried out by the grinding machine 100 based on the deviation, or change of position, as is explained below by means of a simple example.

In one example, the CNC-control 50 and/or the first-cut detection 51 may carry out a relative approaching movement ZB(Y) in order to bring the grinding tool 10 and the dressing tool 31 in a predefined relative or given position, relative to each other. When reaching the predefined relative or given position, the dressing tool 31 should provide a signal for a contact. Due to a change of the temperature, though, a change or deviation has occurred, and the mutual contacting, occurs only after the approaching movement in the direction ZB(Y) has continued a further distance. In this example, the contacting only occurs after an additional 1 mm. That is, the Current Position has changed with respect to the relative or given position by 1 mm. Since in the present example the approaching movement ZB(Y) is taking place in parallel to the tool axis A1, one may determine based on the present Current Position in comparison to the reference or given position how to carry out the actual (dressing) movements AB(X, Y) in order to compensate for the change of position.

A path sensor WS may be assigned to the tool spindle 11, respectively the drive 12, as depicted in FIGS. 1A, 1B and 3 (it should be noted that the link between the respective sensor WS and the control 50 are not depicted in these figures). Such a path sensor WS is not situated in certain embodiments, at the foremost end of the spindle 11, but, for instance, in the area of the drive 12. Temperature-induced expansions or contractions of the spindle 11 and tool 12 thus cannot be detected by the path sensor WS. However, different embodiments of the invention may provide an inexpensive remedy.

It is to be noted that the embodiment illustrated in FIGS. 1A and 1B is adapted to detect changes in radial direction. A change of the circumference of the grinding tool 10 may thus be detected since, in case of an expansion of the tool 10, the annular area 13 of the outer circumference is radially displaced outwardly. In this case, contact would occur earlier (and not later, as in the case of the example described).

Temperature-induced changes often occur in the direction of the tool axis A1. This occurs, for instance, due to a change of the length of a spindle 11. In order to be able to detect and compensate such a change, the approaching movement ZB(X) may be directed so that the dressing tool 31 contacts the grinding tool 10 at a surface which is in a plane which lies perpendicular to the tool axis A1 or which at least is inclined with respect to the tool axis A1. The advancing movement is referred to as ZB(X) since the advancing movement in the example of FIG. 2 is parallel with respect to the X-axis.

A step ZR may be carried out after the contacting in order to increase the relative distance right after the contact. This step in certain embodiments is carried out automatically and is thus referred to as an automated increase of distance. The automated increase of distance may be carried out immediately after a contacting of the grinding tool 10 with the dressing tool 31 in order to adjust a relative distance ΔA of the grinding tool 10 with respect to the dressing tool 31. In certain embodiments, the absolute value |ΔA| of the relative distance ΔA is predefined. In FIG. 2, a relative distance ΔA is depicted.

The step ZR in the embodiment of FIG. 2 has a direction which corresponds to the direction of the approaching movement ZB(X), which had just been carried out. The direction of the movement of step ZR is opposite to the direction of the approaching movement ZB(X).

An exemplary CNC-controlled spiral bevel gear grinding machine 100 is shown in FIG. 3. The grinding machine 100 comprises a vertical grinding spindle 11 (A1-axis) with a grinding tool 10. The work piece 20 to be machined (not shown) sits on the B-axis. An upright dresser 30 with dressing tool 31 is situated on the left-hand side of the grinding spindle 11. The dressing tool 31 may be driven by means of its drive 32 (see FIG. 2, for example) so as to rotate about the dressing axis R1. In addition, the grinding machine 100 comprises three linear axis X, Y, Z with correspondingly assigned drives, as well as a pivot axis C, as shown in FIG. 3. The different axis, and, respectively, their drives, may be controlled by a CNC-control 50, as already mentioned. The CNC-control 50, together with the already-mentioned first-cut detection 51, are shown in schematic form next to the machine 100. The circuit connections I1, I2 are bundled or combined here in order to indicate that these connections may be routed along a common signal bus, for example.

Embodiments of the invention may be implemented in the grinding machine 100 by an adequate programming of the CNC-control 50 and/or the first-cut detection 51. Grinding machine 100 may, for example, be enabled to carry out the following steps:

a. Controlling the movements ZB (e.g. ZB(Y) or ZB(X)) of the dressing tool 31 relative to the grinding tool 10 in order to relatively move the dressing tool 31 towards the grinding tool 10, b. Checking whether the first-cut detection 51 signalizes a contact of the grinding tool 10 and the dressing tool 31, c. Repeating the steps a. to b. until a contact between the grinding tool 10 and the dressing tool 31 is signaled d. If a contact between the grinding tool 10 and the dressing tool 31 was signaled, the following steps may be performed:
  i. Recording the Current Position,
  ii. Carrying out a compensation calculation using the Current Position and a reference or given position.

There are multiple possibilities for implementing the first-cut detection 51 in a grinding machine 100.

For example, the first-cut detection 51 can monitor the current or the voltage of a drive 12 of the grinding tool 10 and/or of a drive 32 of the dressing tool 31. If a change of the current or voltage occurs, which presumably results from an increased power intake of the drive 12 and/or drive 32, then the first-cut detection 51 signals a contact. The increased power intake in case of a contact is caused by the friction between the grinding tool 10 and the dressing tool 31.

As an alternative or in addition, the first-cut detection 51 may monitor the output signal of a vibration sensor 40 in order to detect a contact, as indicated by increased vibration. An increase of the vibration presumably is caused by a contact of the grinding tool 10 with the dressing tool 31. An acceleration sensor may be used as a vibration sensor 40, which is placed on the grinding spindle and/or the dresser 30, though it should be understood that other types of vibration sensors may be used.

As an alternative or in addition, the first-cut detection 51 may monitor the output signal of an acoustic sensor 40 in order to detect a contact in case of an increased sound intensity. The increase of the sound intensity is presumably caused by a contact of the grinding tool 10 with the dressing tool 31. A sound-emission-hydrophone, a sound emission pickup or a (piezo-electric) body sound sensor, which is placed in the area of the grinding spindle and/or the dresser 30 may be used in different embodiments as the acoustic sensor, though it should be understood that other types of acoustic sensors may be used.

It is schematically indicated in FIG. 3 that such a sensor 40 (e.g. an acoustic sensor, a power sensor or a vibration sensor) may be placed in the area of the tool spindle 11. Such a sensor 40 could transmit a signal 51 to the first-cut detection 51, for example, as is schematically illustrated in FIG. 3 by means of a dashed arrow.

There are systems for first-cut detection 51 which may have a very high precision being in the range of micro-millimeters. On the one hand, the accuracy results from the sensitivity of the sensor(s), and on the other hand from the accuracy of the path and/or angle resolution, which is used for determining the Current Position. The precision may be advantageous since temperature induced changes may occur in the range of only few micrometers.

In some embodiments, the following two reactions are taken after (e.g., immediately after) the provision of the signal S1, which signals a contact:

Recording the Current Position,
Carrying out an increase if the distance ZR.

The control 50, in some embodiments, may always know the positions of the elements moved since the control 50 not only defines the movements but also monitors the movements (e.g. using very precise path sensors WS). In case of a contact, a reference value for a subsequent compensation calculation may be provided by recording or storing the present position (called "Current Position").

In certain embodiments, the carrying out of the steps a. to c. above may be triggered only if one of the following conditions is met:

After the grinding machine 100 was not used in production during a pre-defined or definable period of time, and/or After the grinding machine 100 has been reconfigured, and/or After an environment sensor, for example, a temperature sensor, has indicated or signaled a change in temperature.

In certain embodiments, the carrying out of the steps a. to c. is triggered immediately prior to carrying out a dressing process, for reasons of an efficient processing.

Embodiments of the invention may also be implemented in other grinding machines.

As may be recognized by those of ordinary skill in the pertinent art based on the teachings herein, numerous changes and modifications may be made to the above-described and other embodiments of the present invention without departing from the spirit of the invention as defined in the claims. Accordingly, this detailed description of embodiments is to be taken in an illustrative, as opposed to a limiting sense.

What is claimed is:

1. A method comprising:

compensating temperature-induced deviations in a grinding machine comprising a tool spindle with a grinding tool which can be driven so as to rotate, a dresser with a dressing tool which can be driven so as to rotate, a control configured to control movements of the dressing tool relative to the grinding tool, and a first-cut detection module configured to signal a contact of the grinding tool with another part of the grinding machine, the compensating step comprising:

a. controlling movements of the dressing tool relative to the grinding tool so as to move the dressing tool towards the grinding tool, b. checking whether the first-cut detection module signals a contact of the grinding tool with the dressing tool, c. repeating the controlling and checking steps until a contact between the grinding tool and the dressing tool is signaled, and d. when a contact between the grinding tool and the dressing tool is signaled, then
  (i) recording a current position of the grinding tool relative to the dressing tool, and
  (ii) performing a compensation calculation based on the current position and a reference position.

2. The method according to claim 1, further comprising the first-cut detection module monitoring an electric current or voltage of one or more of a drive of the grinding tool or a drive of the dressing tool, and signaling a contact between the dressing tool and the grinding tool when the first cut detection detects a change of the electric current or voltage resulting from an increased power intake of one or more of the drive of the grinding tool or the drive of the dressing tool.

3. The method according to claim 1, further comprising the first-cut detection module monitoring an output signal of a vibration sensor and signaling a contact between the dressing tool and the grinding tool when a monitored vibration exceeds a threshold value.

4. The method according to claim 1, further comprising the first-cut detection module monitoring an output signal of an acoustic sensor and signaling a contact between the dressing tool and the grinding tool when a monitored sound intensity exceeds a threshold value.

5. The method according to claim 1, including performing the controlling and checking steps after one or more of:
   the grinding machine is not used in production for a pre-defined period of time,
   the grinding machine is reconfigured, or
   an environment sensor signals an environment change.

6. The method according to claim 5, wherein the environment sensor comprises a temperature sensor.

7. The method according to claim 1, including performing the controlling and checking steps prior to carrying out a dressing process.

8. The method according to claim 1, wherein the step of performing a compensation calculation further comprises automatically increasing a distance between the dressing tool and the grinding tool in order to adjust a relative distance between the grinding tool and the dressing tool after the grinding tool contacts the dressing tool.

9. The method according to claim 8, wherein an absolute value of the relative distance between the grinding tool and the dressing tool is pre-defined.

10. A grinding machine comprising:
    a tool spindle with a grinding tool which can be driven so as to rotate,
    a dresser with a dressing tool which can be driven so as to rotate,
    a control configured to control movements of the dressing tool relative to the grinding tool, and
    a first-cut detection module configured to signal a contact of the grinding tool with another part of the grinding machine,
    wherein the grinding machine is adapted and programmed to perform the following steps:
    a. controlling movements of the dressing tool relative to the grinding tool so as to move the dressing tool towards the grinding tool,
    b. checking whether the first-cut detection module signals a contact of the grinding tool with the dressing tool,
    c. repeating the controlling and checking steps until a contact between the grinding tool and the dressing tool is signaled, and
    d. when a contact between the grinding tool and the dressing tool is signaled, then
       (i) recording a current position of the grinding tool relative to the dressing tool in a memory of the grinding machine, and
       (ii) performing a compensation calculation based on the current position and a reference position.

11. The grinding machine of claim 10, further comprising means for triggering the controlling and checking steps after one or more of:
    the grinding machine is not used in production for a pre-defined period of time,
    the grinding machine is reconfigured, or
    an environment sensor signals an environment change.

12. The grinding machine of claim 11, wherein the triggering means includes one or more of a CNC-control or the first-cut detection module.

13. The grinding machine of claim 11, wherein the environment sensor comprises a temperature sensor.

* * * * *